United States Patent
Shih et al.

(10) Patent No.: US 11,627,624 B2
(45) Date of Patent: Apr. 11, 2023

(54) METHOD AND APPARATUS FOR HANDLING LBT FAILURE

(71) Applicant: FG Innovation Company Limited, Tuen Mun (HK)

(72) Inventors: Mei-Ju Shih, Taipei (TW); Yung-Lan Tseng, Taipei (TW); Hung-Chen Chen, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 5 days.

(21) Appl. No.: 16/938,792

(22) Filed: Jul. 24, 2020

(65) Prior Publication Data
US 2021/0029768 A1 Jan. 28, 2021

Related U.S. Application Data

(60) Provisional application No. 62/878,622, filed on Jul. 25, 2019.

(51) Int. Cl.
*H04W 76/18* (2018.01)
*H04W 72/04* (2009.01)
(Continued)

(52) U.S. Cl.
CPC ......... *H04W 76/18* (2018.02); *H04W 72/042* (2013.01); *H04W 72/0453* (2013.01); *H04W 74/0833* (2013.01); *H04W 76/30* (2018.02)

(58) Field of Classification Search
None
See application file for complete search history.

(56) References Cited

U.S. PATENT DOCUMENTS

2019/0150064 A1 5/2019 Chen et al.
2019/0313437 A1* 10/2019 Jung ................. H04W 72/0453
(Continued)

FOREIGN PATENT DOCUMENTS

CN 109803354 A 5/2019

OTHER PUBLICATIONS

Spreadtrum Communications, "consideration of LBT failure in NR-U", 3GPP TSG-RAN WG2 Meeting #105, R2-1900937, dated Mar. 1, 2019, all pages (Year: 2019).*

(Continued)

*Primary Examiner* — Chirag G Shah
*Assistant Examiner* — Srinivasa R Reddivalam
(74) *Attorney, Agent, or Firm* — ScienBiziP, P.C.

(57) ABSTRACT

A method for wireless communication performed by a UE is provided. The method includes: receiving, from a serving cell, a bandwidth part (BWP) configuration; configuring a plurality of uplink (UL) BWPs in the serving cell based on the BWP configuration; determining that listen-before-talk (LBT) fails in a first UL BWP of the plurality of UL BWPs; switching from the first UL BWP to a second UL BWP of the plurality of UL BWPs after determining that the second UL BWP is configured with physical random access channel (PRACH) occasions and LBT has not failed in the second UL BWP; and releasing a radio resource control (RRC) connection and transitioning to an RRC_IDLE state after determining that LBT has failed in each of the plurality of UL BWPs that is configured with PRACH occasions.

16 Claims, 4 Drawing Sheets

(51) Int. Cl.
    *H04W 76/30*     (2018.01)
    *H04W 74/08*     (2009.01)
    *H04W 72/0453*     (2023.01)

(56) References Cited

U.S. PATENT DOCUMENTS

| | | | |
|---|---|---|---|
| 2020/0296635 A1* | 9/2020 | Rastegardoost | H04L 5/0048 |
| 2021/0112592 A1* | 4/2021 | Lee | H04W 74/006 |
| 2021/0153245 A1* | 5/2021 | Tooher | H04W 72/046 |
| 2021/0235500 A1* | 7/2021 | Hong | H04W 74/0825 |
| 2021/0250793 A1* | 8/2021 | Shi | H04W 24/08 |
| 2021/0328650 A1* | 10/2021 | Awad | H04B 7/0695 |
| 2021/0377956 A1* | 12/2021 | Lee | H04W 72/0486 |

OTHER PUBLICATIONS

CMCC, Considerations on BWP switching and multi-activation for NR-U, 3GPP TSG-RAN WG2 Meeting #104 R2-1818129, Nov. 16, 2018(Nov. 16, 2018), section 2.

CMCC, BWP and sub-band switching for NR-U, 3GPP TSG-RAN WG2 Meeting #106 R2-1905928, May 17, 2019 (May 17, 2019), section 2.

3GPP TS 38.304, "3rd Generation Partnership Project; Technical Specification Group Radio Access Network; NR; User Equipment (UE) procedures in Idle mode and RRC Inactive state (Release 15)", Technical Specification, V15.4.0 (Jun. 2019).

* cited by examiner

METHOD AND APPARATUS FOR
HANDLING LBT FAILURE

CROSS-REFERENCE TO RELATED
APPLICATION(S)

The present disclosure claims the benefit of and priority of provisional U.S. Patent Application Ser. No. 62/878,622, filed on Jul. 25, 2019, entitled "Method and Apparatus for BWP Switch in the Unlicensed Spectrum" ("the '622 provisional"). The disclosure of the '622 provisional is hereby incorporated fully by reference into the present disclosure for all purposes.

FIELD

The present disclosure is related to wireless communication, and more particularly, to a method for handling Listen-Before-Talk (LBT) failure in cellular wireless communication networks.

BACKGROUND

Various efforts have been made to improve different aspects of wireless communication for cellular wireless communication systems, such as fifth generation (5G) New Radio (NR) by improving data rate, latency, reliability, and mobility. For radio access technology deployed on an unlicensed spectrum, devices (e.g., User Equipment (UE), Base Station (BS), Access Point (AP)) adopt LBT mechanism before accessing a channel. The devices may perform clear channel assessment (CCA) before transmitting on the unlicensed channel. If LBT fails, the device(s) may not access the channel for a certain time period. There is a need for an improved and efficient mechanism for a UE to handle LBT failure.

SUMMARY

The present disclosure is related to a method for handling LBT failure in cellular wireless communication network.

According to an aspect of the present disclosure, a UE is provided that includes one or more non-transitory computer-readable media containing computer-executable instructions embodied therein and at least one processor coupled to the one or more non-transitory computer-readable media. The at least one processor is configured to execute the computer-executable instructions to: receive, from a serving cell, a bandwidth part (BWP) configuration; configure a plurality of uplink (UL) BWPs in the serving cell based on the BWP configuration; determine that listen-before-talk (LBT) fails in a first UL BWP of the plurality of UL BWPs; switch from the first UL BWP to a second UL BWP of the plurality of UL BWPs after determining that the second UL BWP is configured with physical random access channel (PRACH) occasions and LBT has not failed in the second UL BWP; release a radio resource control (RRC) connection and transition to an RRC_IDLE state after determining that LBT has failed in each of the plurality of UL BWPs that is configured with PRACH occasions.

According to another aspect of the present disclosure, a method for wireless communication performed by a UE is provided. The method includes: receiving, from a serving cell, a BWP configuration; configuring a plurality of UL BWPs in the serving cell based on the BWP configuration; determining that LBT fails in a first UL BWP of the plurality of UL BWPs; switching from the first UL BWP to a second UL BWP of the plurality of UL BWPs after determining that the second UL BWP is configured with PRACH occasions and LBT has not failed in the second UL BWP; and releasing an RRC connection and transitioning to an RRC_IDLE state after determining that LBT has failed in each of the plurality of UL BWPs that is configured with PRACH occasions.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

DESCRIPTION

Figure 1:
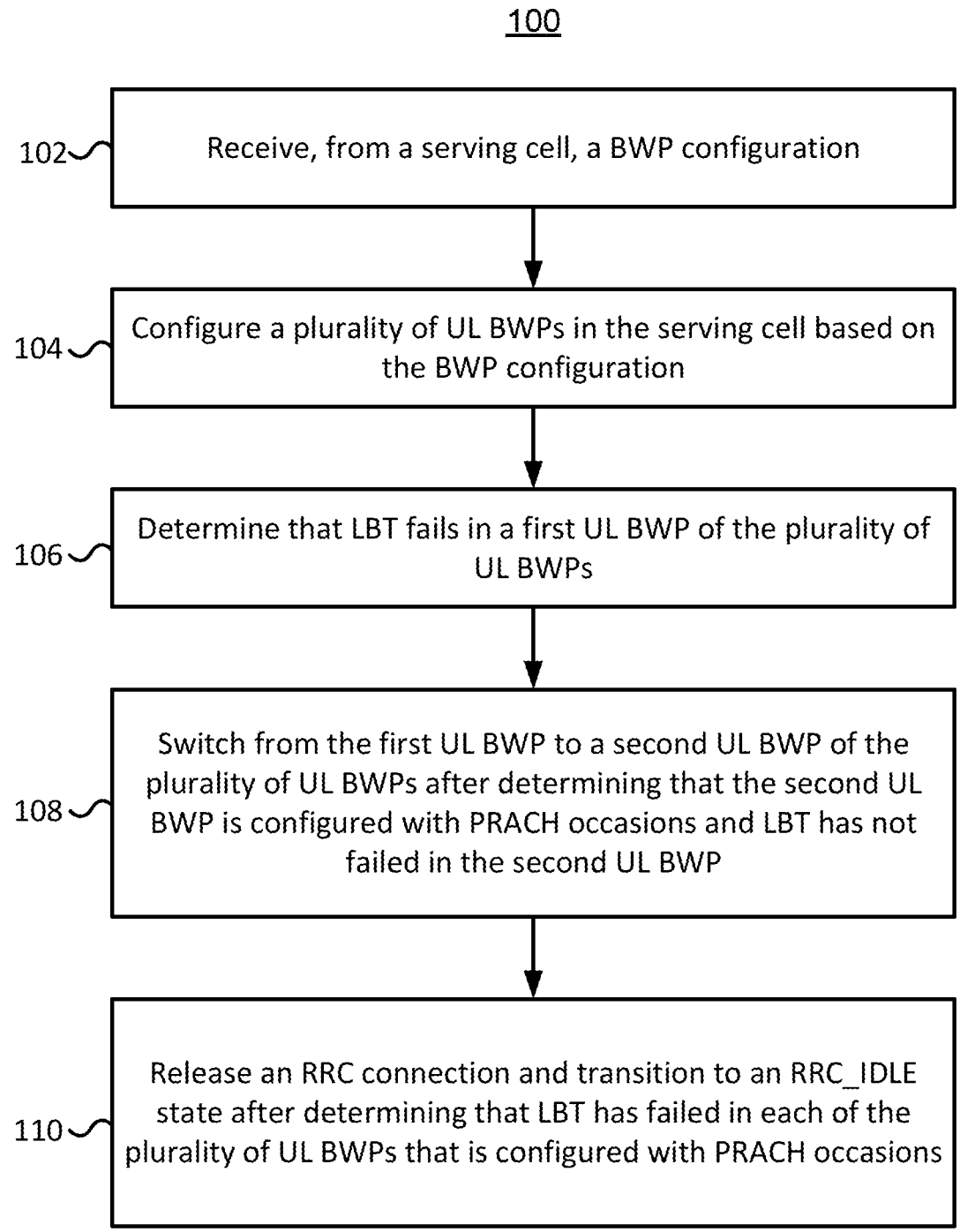
FIG. 1 is a flowchart of a method performed by a UE for handing LBT failure according to an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more B Ss.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, a ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally UL resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

NR-based unlicensed access (NR-U) may take the LBT mechanism into consideration. The deployment scenarios of NR-based unlicensed access may include:

Carrier aggregation (CA) between licensed band NR (PCell/Primary cell) and NR-U (SCell/Secondary Cell). NR-U SCell may have both DL and UL, or DL-only. A Primary Cell (PCell) may be a cell in a master cell group (MCG) (e.g., an MCG cell), operating on the primary frequency, in which the UE may either perform the initial connection establishment procedure or initiate the connection re-establishment procedure.

Dual connectivity (DC) between licensed band LTE (PCell) and NR-U (PSCell/Primary SCG cell). SCG means secondary cell group. A Primary SCG cell may be a cell in the SCG (e.g., an SCG cell), for dual connectivity or multi-connectivity (MC) operation, in which the UE may perform random access (RA) when performing the Reconfiguration with Sync procedure.

Stand-alone NR-U.

An NR cell with DL in unlicensed band and UL in licensed band.

Dual connectivity between licensed band NR (PCell) and NR-U (PSCell).

Among the deployment scenarios, paging enhancement may be required at least in (but not limited to) the stand-alone NR-U case.

The bandwidth of the initial (active) DL/UL BWP is approximately 20 MHz for the unlicensed spectrum (e.g., 5 GHz band, 6 GHz band). A subset of the total cell bandwidth of a cell is referred to as a BWP. The bandwidth of the initial (active) DL/UL BWP may be approximately 20 MHz for the dedicated spectrum, which may be applied for a specific purpose or for a specific group of devices (e.g., the private network, the non-public network (NPN)).

Considering LBT, a cell/gNB may transmit Physical Downlink Shared Channel (PDSCH) on portions of or the entire of single BWP where CCA is successful at the cell/gNB. In other words, the cell/gNB may not access an activated BWP that a UE is configured to monitor (e.g., due to LBT failure on the unlicensed spectrum). The UE may consume power on the activated BWP that the cell/gNB cannot access. The UE may consume power on the activated BWP that the UE cannot access (e.g., due to LBT failure at the UE side). A BWP switch procedure is provided in the present disclosure for the UE to switch to other BWP(s) (e.g., a less congested BWP). For example, the UE may switch from a source BWP to a target BWP.

Paging allows the network to reach UEs in RRC_IDLE state and in RRC_INACTIVE state, and to notify UEs in RRC_IDLE state, RRC_INACTIVE state or RRC_CONNECTED state of system information (SI) change and Earthquake and Tsunami Warning System (ETWS)/Commercial Mobile Alert System (CMAS) indications. A UE in the RRC_CONNECTED state, RRC_IDLE state, or RRC_INACTIVE state may be also referred to as an RRC_CONNECTED UE, RRC_IDLE UE, or RRC_INACTIVE UE, respectively.

An RRC_IDLE/RRC_INACTIVE UE may receive the paging for mobile terminated data, which is initiated by the core network (e.g., 5G Core Network (5GC), Evolved Packet Core (EPC)). An RRC_IDLE/RRC_INACTIVE UE may receive the paging for mobile terminated data area, which is managed by the core network. An RRC_IDLE/RRC_INACTIVE UE may be configured with Discontinuous Reception (DRX) by Non-Access Stratum (NAS) for receiving CN paging. An RRC_INACTIVE UE may receive the paging initiated by next generation (NG)-RAN (e.g., RAN paging). An RRC_INACTIVE UE may be configured with DRX by NG-RAN for RAN paging. NG-RAN may refer to a NG radio access network. An NG-RAN node may be either a gNB, providing NR user plane and control plane protocol terminations towards the UE, or a ng-eNB, providing E-UTRA user plane and control plane protocol terminations towards the UE.

An RRC_IDLE UE or RRC_INACTIVE UE may not monitor paging channel(s) continuously. An RRC_IDLE UE or an RRC_INACTIVE UE may monitor paging channels during one or multiple Paging Occasions (POs) per DRX cycle. APO may be a set of Physical Downlink Control Channel (PDCCH) monitoring occasions and may consist of multiple time slots (e.g., subframe or OFDM symbol) where paging Downlink Control Information (DCI) can be sent by a serving cell/camped cell/gNB. The DRX cycle may be broadcast by the serving cell/camped cell/gNB in system information for CN paging. The DRX cycle may be UE-specific, which is configured via NAS signaling for CN paging. The DRX cycle may be UE-specific, which is configured via RRC signaling for RAN paging. If the UE is configured with multiple DRX cycles (e.g., by the serving cell/camped cell/gNB, by pre-configuration, by the upper layers (e.g., NAS layer, application layer) of the UE), the UE may apply the shortest DRX cycle among the configured DRX cycles. An RRC_CONNECTED UE may monitor the paging channels in any PO signaled in system information. The serving cell/camped cell/gNB may signal the time/frequency resource allocation of the PO(s) to the UE via the system information. For an RRC_CONNECTED UE having an active BWP with common search space configured to monitor paging channel(s), the UE may monitor the system information change indication in any PO at least once in a modification period. For a UE in the RRC_CONNECTED state not configured with CA/DC/MC, there may be only one serving cell, which may be referred to as the primary cell. For a UE in the RRC_CONNECTED state configured with CA/DC/MC, the term 'serving cells' may be used to denote the set of cells including the Special Cell(s) and all secondary cells. For DC/MC operation, the term Special Cell may refer to the PCell of the MCG or the PSCell of the SCG, otherwise the term Special Cell may refer to the PCell. For a UE in the RRC_IDLE/RRC_INACTIVE state, the term "camped cell" may be used to denote the cell on which the UE camps. However, the terms "serving cell" and "camped cell" may be used interchangeably in the present disclosure.

For paging, the Radio Link Control (RLC) entity of the UE may use Transparent Mode (TM) mode, which is one of RLC transmission modes. For paging, the UE may use the logical channel, e.g., Paging Control Channel (PCCH), between the RLC entity and Medium Access Control (MAC) entity of the UE. PCCH is a DL channel that carries paging messages. Both paging messages and Short Messages may be addressed with paging-radio network temporary identifier (P-RNTI) on PDCCH. The former may be sent on PCCH, while the latter may be sent over PDCCH directly. The Short Messages may indicate the system information change notifications and indicate the ongoing Public Warning Systems (PWS) (e.g., ETWS, CMAS) broadcasts. For example, ETWS or CMAS capable UE(s) in RRC_IDLE or in RRC_INACTIVE may monitor ETWS/CMAS indication in its own PO. ETWS or CMAS capable UE(s) in RRC_CONNECTED may monitor ETWS/CMAS indication in any PO. If the UE receives the paging that indicates ETWS/CMAS notification, the UE may trigger the acquisition of SI without delaying until the next modification period. The PCCH may be mapped to Paging Channel (PCH), a transport channel between the MAC entity and PHY Layer of the UE.

For DL operation, the following options for BWP-based operation within a carrier with bandwidth larger than 20 MHz may be considered.

Option 1a: Multiple BWPs may be configured, multiple BWPs may be activated, transmission of PDSCH by the cell/gNB on one or more BWPs Option 1b: Multiple BWPs may be configured, multiple BWPs may be activated, transmission of PDSCH by the cell/gNB on a single BWP Option 2: Multiple BWPs may be configured, single BWP may be activated, the cell/gNB may transmit PDSCH on a single BWP if CCA is successful at the cell/gNB for the whole BWP Option 3: Multiple BWPs may be configured, single BWP may be activated, the cell/gNB may transmit PDSCH on portions of or the entire of single BWP where CCA is successful at the cell/gNB For UL operation, the following options for BWP-based operation within a carrier with bandwidth larger than 20 MHz may be considered.

Option 1a: Multiple BWPs may be configured, multiple BWPs may be activated, transmission of Physical Uplink Shared Channel (PUSCH) by the UE on one or more BWPs Option 1b: Multiple BWPs may be configured, multiple BWPs may be activated, transmission of PUSCH by the UE on a single BWP Option 2: Multiple BWPs may be configured, single BWP may be activated, the UE may transmit PUSCH on a single BWP if CCA is successful at the UE for the entire BWP Option 3: Multiple BWPs may be configured, single BWP activated, the UE may transmit PUSCH on portions of or the entire of single BWP where CCA is successful at the UE Upon UL transmission on configured grant, a BWP inactivity timer (e.g., bwp-InactivityTimer) may be restarted (i.e., at LBT success).

To enable Bandwidth Adaptation (BA) on the PCell, the gNB may configure the UE with UL and DL BWP(s). To enable BA on SCells in case of CA, the gNB may configure the UE with DL BWP(s) at least (i.e., there may be none in the UL). For the PCell, the initial (DL/UL) BWP is the BWP used for initial access. For the SCell(s), the initial (DL/UL) BWP (or the first active BWP if configured) is the BWP configured for the UE to first operate at SCell activation.

In paired spectrum, DL and UL may switch BWP independently. In unpaired spectrum, DL and UL may switch BWP simultaneously. Switching between configured BWPs may occur by means of dedicated signaling (e.g., via RRC messages), DCI, an inactivity timer (e.g., bwp-InactivityTimer), or upon initiation of random access. When an inactivity timer is configured for a serving cell, the UE may switch the active BWP to a default BWP configured by the network upon expiry of the inactivity timer associated with the serving cell.

In some implementations, the UE may perform BWP switch from the current activated BWP to other BWP(s) (e.g., target BWP). Therefore, the UE may receive the paging, DL data, dedicated signaling (e.g., via RRC messages) and/or system information on the target BWP. For example, the serving (camped) cell/gNB may be able to access only portions of BWPs on the entire band due to LBT failure. If a UE keeps monitoring a BWP (e.g., initial DL BWP) that the serving (camped) cell/gNB fails to access due to LBT failure, the UE may not be able to receive any DL information (e.g., Synchronization Signal Block (SSB) set, PDCCH, DL-SCH, paging, system information, DL data) on the BWP. Similarly, for UL direction, the UE may be able to access only portions of BWPs on the entire band due to LBT failure. If the UE keeps transmitting in a UL BWP in which LBT fails, the UL BWP may be congested and the UE may not be able to transmit any UL information (e.g., preamble(s) in PRACH occasions in an RA procedure, Msg A/Msg 3/Msg 5 in an RA procedure, Scheduling Request (SR)/ Buffer Status Report (BSR)/RRC message(s) in UL resources) on the UL BWP. Thus, it is beneficial to propose a BWP switch mechanism for a UE to switch from a BWP (e.g., a more congested BWP) to another BWP(s) (e.g., a less congested BWP).

Case 1: Timer for BWP Switch

In some implementations, the UE may receive a timer for BWP switch from the serving (camped) cell/gNB. Examples of the timer for BWP switch may include, but not limited to, a BWP inactivity timer. The timer for BWP switch may be also referred to as "the timer" or "the proposed timer" in the present disclosure. The UE may perform the BWP switch when the timer expires. The timer may be configured per cell group (e.g., via cell group configuration), per cell (e.g., via serving cell configuration) or per BWP (e.g., via BWP configuration). If the timer is configured per cell and multiple BWP(s) are activated on the cell, the UE may apply the timer for each activated BWP (i.e., the same timer value but different timers for the corresponding activated BWPs), or apply the timer shared by all activated BWPs (i.e., the same timer value and the same timer for all activated BWPs) (e.g., the UE may (re)start the timer when one of the BWP(s) is activated, the UE may (re)start the timer whenever a BWP is activated, the UE may stop the timer when the last BWP among the activated BWPs is deactivated).

An active BWP may be a default UL/DL BWP, an initial UL/DL BWP, a first active UL/DL BWP, or other (configured) UL/DL BWP. In one implementation, an active BWP may be used by the UE for UL and DL simultaneously (e.g., in the unpaired spectrum case). For example, the fact that the UE switches the active BWP for UL may represent that the UE also switches the active BWP for DL. In one implementation, different BWPs may be used by the UE for UL and DL respectively (e.g., in the paired spectrum case). For example, an active BWP is for DL, while another active BWP is for UL.

When the UE performs BWP switch for a serving cell, a target BWP to which the UE switches may be activated (e.g., activated BWP), and a source BWP from which the UE switches may be deactivated (e.g., deactivated BWP). In some implementations, the MAC entity of the UE may transmit on an Uplink Shared Channel (UL-SCH) on the activated BWP, transmit on a Random Access Channel (RACH) on the activated BWP if PRACH occasions are configured on the activated BWP, monitor the PDCCH on the activated BWP, transmit a Physical Uplink Control Channel (PUCCH) on the activated BWP if configured, receive a Downlink Shared Channel (DL-SCH) on the activated BWP, report Channel State Information (CSI) for the activated BWP, and/or transmit a Sounding Reference Signal (SRS) on the activated BWP if configured. The MAC entity of the UE may not transmit on UL-SCH on the deactivated BWP, may not transmit on RACH on the deactivated BWP, may not monitor the PDCCH on the deactivated BWP, may not transmit the PUCCH on the deactivated BWP, may not receive a DL-SCH on the deactivated BWP, may not report CSI for the deactivated BWP, and/or may not transmit an SRS on the deactivated BWP.

In some implementations, an inactive state of a BWP may be applied. An inactive state of a BWP may refer to a configured BWP not being activated. For example, a UE may be configured with multiple BWPs in a serving cell, including a source BWP and a target BWP. If a UE performs BWP switch from the source BWP to the target BWP, the source BWP may be inactivated, and the target BWP may be activated. In other implementations, if a UE performs BWP switch from the source BWP to the target BWP, the source BWP may be deactivated, and the target BWP may be activated. To further elaborate the difference between a deactivated BWP and an inactivated BWP, a BWP may be deactivated if the UE releases a BWP configuration for the BWP, while a BWP may be inactivated if the UE keeps a BWP configuration for the BWP and the BWP is not activated. In some implementations, the MAC entity of the UE may not transmit on the UL-SCH on the inactivated BWP, may not transmit on the RACH on the inactivated BWP, may not monitor the PDCCH on the inactivated BWP, may not transmit the PUCCH on the inactivated BWP, may not receive the DL-SCH on the inactivated BWP, may not report CSI for the inactivated BWP, and/or may not transmit the SRS on the inactivated BWP.

Implementations in the present disclosure may be applied to a UE and a cell/gNB when the UE is configured with a single BWP or multiple BWP(s), and when one or more BWP(s) are activated. Implementations in the present disclosure may be applied to DL operation (e.g., Option 1a, Option 1b, Option 2, Option 3) and UL operation (e.g., Option 1a, Option 1b, Option 2, Option 3). Implementations in the present disclosure may be applied to BWP operation on a PCell, SCell and PSCell. Implementations in the present disclosure may be applied to the paired spectrum and unpaired spectrum.

In some implementations, the UE may receive (the initial value for) the timer via system information (e.g., SIB1 or other SI) or an RRC message (e.g., RRC Reconfiguration message, RRC Reconfiguration message with information including reconfiguration with sync configuration, RRC Reconfiguration message without the information of reconfiguration with sync configuration, in the information of reconfiguration with sync configuration included in RRC Reconfiguration message, RRC Resume message, RRC Setup message, RRC Reestablishment message) on a single active BWP. In some implementations, the UE may receive (the initial value for) the timer via the system information (e.g., SIB1 or other SI) or the RRC message (e.g., RRC Reconfiguration message, RRC Reconfiguration message with information including reconfiguration with sync configuration, RRC Reconfiguration message without the information of reconfiguration with sync configuration, in the information of reconfiguration with sync configuration included in RRC Reconfiguration message, RRC Resume message, RRC Setup message, RRC Reestablishment message) on (at least) one of the active BWP(s). In some implementations, the UE may receive (the initial value for) the timer via the system information (e.g., SIB1 or other SI) or the RRC message (e.g., RRC Reconfiguration message, RRC Reconfiguration message with information including reconfiguration with sync configuration, RRC Reconfiguration message without the information of reconfiguration with sync configuration, in the information of reconfiguration with sync configuration included in RRC Reconfiguration message, RRC Resume message, RRC Setup message, RRC Reestablishment message) on the BWP(s) associated with the timer. Upon BWP switch, the UE may acquire and receive (the initial value for) the timer (or the related value/parameters) in the system information (e.g., SIB1 or other SI) on the BWP(s) associated with the timer. In one implementation, the UE may receive (the initial value for) the timer on a BWP not associated with the timer.

In some implementations, the UE may receive (the initial value for) the timer in a serving cell configuration (e.g., ServingCellConfig Information Element (IE)). The timer may be associated with an SpCell (e.g., PCell, PSCell) or an SCell of an MCG or SCG. In some implementations, the UE may receive (the initial value for) the timer in a BWP configuration (e.g., BWP-DownlinkDedicated IE, BWP-DownlinkCommon IE, BWP Downlink IE). (The initial value for) The timer may be associated with the BWP configured by the BWP configuration. In some implementations, (the initial value for) the timer may be associated with any (activated, inactivated or configured) BWP but configured via a serving cell configuration. In some implementations, (the initial value for) the timer may be UE-specific, cell-specific, cell-group-specific, and/or BWP-specific.

The value of the timer may be (but not limited to) 1, 2, 3, 4, 5, 6, 8, 10, 20, 30, 40, 50, 60, 80, 100, 200, 300, 500, 750, 1280, 1920, or 2560 ms.

In some implementations, the UE may (re)start the timer when the UE receives (the initial value for) the timer and/or when the UE performs BWP switch and/or when UL/DL LBT fails on the corresponding BWP associated with the timer. In some implementations, the UE may store (the initial value for) the timer when the UE receives the (the initial value for) the timer, and (re)start the timer in other conditions.

In some implementations, the UE may (re)start the timer when the UE receives a paging DCI (e.g., PDCCH addressed to P-RNTI) on (or for) the single active BWP. In some implementations, the UE may (re)start the timer when the UE receives the paging DCI (e.g., PDCCH addressed to P-RNTI) on (or for) one of the active BWP(s). In some implementations, the UE may (re)start all timers associated with active BWP(s), when the UE receives the paging DCI (e.g., PDCCH addressed P-RNTI) on (or for) one of the active BWP(s). In some implementations, the UE may (re)start the timer when the UE receives the paging DCI (e.g., PDCCH addressed to P-RNTI) on (or for) the BWP associated with the timer. The terms "active BWP" and "activated BWP" may be used interchangeably in the present disclosure.

In some implementations, the UE may (re)start the timer when the UE receives DL-SCH (or DL data) or dedicated signaling (e.g., RRC message, RRC Reconfiguration message, RRC Setup message, RRC Resume message, RRC Reestablishment message) on (or for) the single active BWP. In some implementations, the UE may (re)start the timer when the UE receives the DL data (or DL-SCH) on (or for) one of the active BWP(s). In some implementations, the UE may (re)start all timers associated with active BWP(s), when the UE receives the DL data (or DL-SCH) on (or for) one of the active BWP(s). In some implementations, the UE may (re)start the timer when the UE receives the DL data (or DL-SCH) on (or for) the BWP associated with the timer. In some implementations, the UE may (re)start the timer when the UE transmits the UL-SCH (or UL data), UL-related control information (e.g., Uplink Control Information (UCI), SR, BSR, MAC Control Element (CE)), random access preambles or dedicated signaling (e.g., RRC message, RRC Reconfiguration Complete message, RRC Setup Complete message, RRC Resume Complete message, RRC Reestablishment Complete message) on (or for) the single active BWP. In some implementations, the UE may (re)start the timer when the UE transmits the UL data (or UL-SCH), UL-related control information (e.g., UCI, SR, BSR, MAC CE), random access preambles or dedicated signaling (e.g., RRC message, RRC Reconfiguration Complete message, RRC Setup Complete message, RRC Resume Complete message, RRC Reestablishment Complete message), on (or for) one of the active BWP(s). In some implementations, the UE may (re)start all timers associated with active BWP(s), when the UE transmits the UL data (or UL-SCH), UL-related control information (e.g., UCI, SR, BSR, MAC CE), random access preambles or dedicated signaling (e.g., RRC message, RRC Reconfiguration Complete message, RRC Setup Complete message, RRC Resume Complete message, RRC Reestablishment Complete message), on (or for) one of the active BWP(s). In some implementations, the UE may (re)start the timer when the UE transmits the UL data (or UL-SCH), UL-related control information (e.g., UCI, SR, BSR, MAC CE), random access preambles or dedicated signaling (e.g., RRC message, RRC Reconfiguration Complete message, RRC Setup Complete message, RRC Resume Complete message, RRC Reestablishment Complete message), on (or for) the BWP associated with the timer. In some implementations, if the UL LBT succeeds, the UE may (successfully) transmit the UL data (or UL-SCH), UL-related control information (e.g., UCI, SR, BSR, MAC CE), random access preambles or dedicated signaling (e.g., RRC message, RRC Reconfiguration Complete message, RRC Setup Complete message, RRC Resume Complete message, RRC Reestablishment Complete message).

In some implementations, the UE may (re)start the timer when the UE receives the SSB set or system information (e.g., Master Information Block (MIB), SIB1, other SI) on (or for) the single active BWP. In some implementations, the UE may (re)start the timer when the UE receives the SSB set or system information (e.g., MIB, SIB1, other SI) on (or for) one of the active BWP(s). In some implementations, the UE may (re)start all timers associated with active BWP(s), when the UE receives the SSB set or system information (e.g., MIB, SIB1, other SI) on (or for) one of the active BWP(s). In some implementations, the UE may (re)start the timer when the UE receives the SSB set or system information (e.g., MIB, SIB1, other SI) on (or for) the BWP associated with the timer. In one implementation, the reception of MIB may refer to the UE receiving at least one MIB (e.g., with received signal strength above a threshold) before performing soft combining. In one implementation, the reception of MIB may refer to the UE receiving MIB(s) and decoding the content of MIB(s) successfully, e.g., via soft combining.

In some implementations, the UE may (re)start the timer when the UE receives, on (or for) the single active BWP, a DCI that activates a BWP associated with the timer. In some implementations, the UE may (re)start the timer when the UE receives, on (or for) one of the active BWP(s), a DCI that activates a BWP associated with the timer (e.g., if multiple BWPs are configured). In some implementations, the UE may (re)start all timers associated with active BWP(s), when the UE receives, on (or for) one of the active BWP(s), a DCI that activates a BWP associated with the timer. In some implementations, the UE may (re)start the timer when the UE receives, on (or for) the BWP associated with the timer, a DCI that activates a BWP associated with the timer.

In some implementations, the UE may (re)start the timer when the UE receives, on (or for) the single active BWP, a PDCCH on a target BWP associated with the timer for BWP switch operation. In some implementations, the UE may (re)start the timer when the UE receives, on (or for) one of the active BWP(s), the PDCCH on the target BWP associated with the timer for BWP switch operation. In some implementations, the UE may (re)start all timers associated with active BWP(s), when the UE receives, on (or for) one of the active BWP(s), the PDCCH on the target BWP associated with a timer among all timers associated with active BWP(s) for BWP switch operation. In some implementations, the UE may (re)start the timer when the UE receives, on (or for) the BWP associated with the timer, the PDCCH on the target BWP associated with the timer for BWP switch operation. A timer may be associated with a target BWP of a BWP switch procedure performed by the UE upon expiry of the timer.

Table 1 below shows an example procedure performed by the MAC entity of the UE with respect to the timer.

TABLE 1

The MAC entity may for each activated Serving Cell configured with the timer
    1> if the defaultDownlinkBWP-Id is configured, and the active DL BWP is
        not the BWP indicated by the defaultDownlinkBWP-Id; or
    1> if the defaultDownlinkBWP-Id is not configured, and the active DL BWP
        is not the initialDownlinkBWP:
        2> if a PDCCH addressed to Cell-Radio Network Temporary Identifier (C-
            RNTI) or Configured Scheduling RNTI (CS-RNTI) or P-RNTI indicating
            DL assignment or UL grant is received on the active BWP; or
        2> if a PDCCH addressed to C-RNTI or CS-RNTI or P-RNTI indicating DL
            assignment or UL grant is received for the active BWP; or
        2> if a MAC Packet Data Unit (PDU) is transmitted in a configured UL grant
            or received in a configured DL assignment:
            3> if there is no ongoing RA procedure associated with this Serving Cell;
                or
            3> if the ongoing RA procedure associated with this Serving Cell is
                successfully completed upon reception of this PDCCH addressed to C-
                RNTI or P-RNTI:
                4> start or restart the timer associated with the active DL BWP.

In some implementations, the UE may stop, discard and/or release the timer when the UE receives an RRC message (e.g., RRC Release message with/without suspend configuration, RRC Reconfiguration message with information including the reconfigure with sync configuration, RRC Reconfiguration message without information including the reconfigure with sync configuration, RRC Resume message, RRC Setup message, RRC Reestablishment message) on (or for) the single active BWP. In some implementations, the UE may stop, discard and/or release the timer when the UE receives the RRC message (e.g., RRC Release message with/without suspend configuration, RRC Reconfiguration message with information including the reconfigure with sync configuration, RRC Reconfiguration message without information including the reconfigure with sync configuration, RRC Resume message, RRC Setup message, RRC Reestablishment message) on (or for) one of the active BWP(s). In some implementations, the UE may stop, discard and/or release the timer when the UE receives the RRC message (e.g., RRC Release message with/without suspend configuration, RRC Reconfiguration message with information including the reconfigure with sync configuration, RRC Reconfiguration message without information including the reconfigure with sync configuration, RRC Resume message, RRC Setup message, RRC Reestablishment message) on (or for) the BWP associated with the timer. In some implementations, when the UE receives the RRC message (e.g., RRC Release message with/without suspend configuration, RRC Reconfiguration message with information including the reconfigure with sync configuration, RRC Reconfiguration message without information including the reconfigure with sync configuration, RRC Resume message, RRC Setup message, RRC Reestablishment message), the UE may perform RRC state transition (e.g., from RRC_CONNECTED to RRC_IDLE, from RRC_CONNECTED to RRC_INACTIVE, from RRC_INACTIVE to RRC_CONNECTED).

In some implementations, the UE may stop, discard and/or release the timer associated with the single active BWP when the UE receives, on (or for) the single active BWP, a DCI to switch the BWP to a target BWP. In some implementations, the UE may stop the timer associated with one of the active BWP(s) when the UE receives, on (or for) one of the active BWP(s), the DCI to switch the BWP to a target BWP. In some implementations, the UE may stop all timers associated with active BWPs(s) when the UE receives, on (or for) one of the active BWP(s), the DCI to switch a BWP to a target BWP. In some implementations, the UE may stop the timer when the UE receives, on (or for) the BWP associated with the timer, the DCI to switch a BWP to a target BWP.

In some implementations, the UE may stop, discard and/or release the timer associated with a BWP if a cell associated with the BWP is deactivated.

In some implementations, the UE may release and/or discard the timers associated with all the configured BWPs after a Data Inactivity timer (e.g., dataInactivityTimer) expires.

In some implementations, the UE may stop, discard and/or release the timers associated with all the configured BWPs if an SCell Deactivation Timer (e.g., sCellDeactivationTimer) expires, or if the SCell associated with all the configured BWPs is deactivated.

In some implementations, the UE may receive (the initial value for) the timer without BWP information together in the same RRC message. In some implementations, the UE may receive (the initial value for) the timer together with the indicated target BWP configuration (e.g., at least a BWP identity (ID)) in the same configuration, in the same RRC message, in the same DCI, and/or in a configuration associated with the DCI that indicates BWP switch. In some implementations, the UE may receive (the initial value for) the timer within a BWP configuration. The BWP configuration may include at least a BWP ID. In some implementations, the UE may receive (the initial value for) the timer together with the indicated source BWP configuration (e.g., at least a BWP ID) in the same configuration and/or in the same RRC message. For example, the UE may receive the BWP #1 configuration together with (or including) (an initial value for) a timer T1 and/or the information for the target BWP #2. The UE may (also) receive the BWP #2 configuration together with (or including) (an initial value for) a timer T2 and/or the information for the target BWP #3. If the BWP #1 is the current active BWP and the timer T1 expires, the UE may switch to the target BWP #2. When the BWP #2 is the current active BWP and the timer T2 expires, the UE may switch to the target BWP #3. In one implementation, (the initial value for) the timer T1 and (the initial value for) the timer T2 may be the same. In another implementation, (the initial value for) the timer T1 and (the initial value for) the timer T2 may be configured differently.

In one implementation, the UE may perform BWP switch when the timer expires. In one implementation, the UE may perform the BWP switch when the timer associated with the active (DL) BWP (e.g., a source DL BWP) expires. In one implementation, the UE may perform the BWP switch when the timer associated with the configured (DL) BWP (e.g., a target DL BWP) expires. In one implementation, the UE may perform the BWP switch when the timer associated with any active/configured (DL) BWP in a cell expires.

Case 2: BWP Switch Procedure

In some implementations, the UE may switch to a BWP indicated by the serving cell in an RRC message or system information. In one implementation, the UE may be configured with the timer and/or the indicated BWP configuration via receiving the same RRC message or the same system information. The configuration for the timer and/or the indicated BWP may be carried in the same RRC message or in the same system information. In one implementation, the UE may be configured with the timer and/or the indicated BWP by receiving separate RRC message(s) and/or separate system information. The configuration for the timer and/or the indicated BWP may be carried in different RRC message(s) or in different system information (e.g., in different system information blocks). The UE may be configured with the indicated BWP by the cell/gNB before the timer expires. In some implementations, the UE may select a configured BWP by itself and switch to the selected BWP. The configured BWP may be one of the BWP(s) indicated by the cell/gNB before the timer expires. In one implementation, after the UE performs BWP switch to a selected configured BWP, the UE may perform the random access procedure to the cell/gNB on the selected configured BWP (e.g., if the UE is configured with PRACH configuration on the selected configured BWP, via system information or via dedicated signaling). For example, the selected configured BWP may be a valid BWP to the UE. The UE may perform an RA procedure to the cell/gNB on a valid BWP. In one implementation, a valid BWP may be a BWP associated with PRACH occasions/configuration/resources. The UE may perform an RA procedure to the cell/gNB based on the PRACH occasions/configuration/resources associated with the valid BWP. The UE may perform an RA procedure to the cell/gNB based on the PRACH occasions/configuration/resources on the valid BWP. In one implementation, for a UE, a valid BWP may be a BWP associated with PRACH occasions/configuration/resources and the UE has not encountered LBT failure on the BWP. Thus, the UE may perform an RA procedure to the cell/gNB based on the PRACH occasions/configuration/resources associated with the valid BWP. The UE may perform an RA procedure to the cell/gNB based on the PRACH occasions/configuration/resources on the valid BWP.

In some implementations, a counter may be used to keep track of the number of valid BWPs. In one implementation, the UE may increment the value of the counter by 1 when a valid BWP becomes invalid, and the UE may decrement the value of the counter by 1 when an invalid BWP becomes valid. The initial value of the counter may be zero. The maximum value of the counter may be the number of BWPs configured to the UE. When the counter reaches the maximum value, the UE may perform a procedure (e.g., an RRC-layer procedure, a MAC-entity procedure) to inform the cell/gNB that all configured BWPs become invalid, such as transmitting a preamble/UCI/MAC CE/RRC message to the cell/gNB. In one implementation, the UE may increment the value of the counter by 1 when an invalid BWP becomes valid, and the UE may decrement the value of the counter by 1 when a valid BWP becomes invalid. The initial value of the counter may be the number of BWPs configured to the UE, assuming that all the BWPs configured to the UE are valid. When the counter reaches zero, the UE may perform a procedure (e.g., an RRC-layer procedure, a MAC-layer procedure) to inform the cell/gNB that all configured BWPs become invalid, such as transmitting a preamble/UCI/MAC CE/RRC message to the cell/gNB.

In one implementation, the UE may perform the BWP switch procedure to switch from a source BWP to a target BWP that is a valid BWP. In one implementation, the target BWP may be a less congested BWP compared with the source BWP. In one implementation, a BWP may be a valid BWP if the BWP is configured with PRACH occasions/configuration. In one implementation, a BWP may be a valid BWP if the BWP is configured with PRACH occasions/configuration and (UL/DL) LBT has not failed in the BWP.

In one implementation, upon BWP switch from a source BWP to a selected configured BWP, the UE may transmit the assistance information to the cell/gNB (e.g., on the selected configured BWP, via UL grant). The assistance information may relate to the BWP congestion situation on the source BWP. The assistance information may include (but not limited to) the source cell/gNB ID and the BWP ID of the source BWP. The UE may receive the configuration of a UL grant used for the selected configured BWP via the source BWP from the cell/gNB. The UE may store the configuration of the UL grant used for the selected configured BWP upon receiving the configuration of the UL grant used for the selected configured BWP. Afterwards, the UE may configure itself the UL grant used for the selected configured BWP after the UE receives and/or stores the configuration of the UL grant used for the selected configured BWP. Alternatively, the UE may configure itself the UL grant used for the selected configured BWP upon performing the BWP switch procedure.

In some implementations, the UE may select a BWP by itself. The UE may switch to the selected BWP when the UE performs the BWP switch procedure. The selected BWP may or may not be configured by the serving cell/gNB to the UE (before the timer expires). The selected BWP may be any BWP that the cell supports. In one implementation, the selected BWP may be a valid BWP. In one implementation, after the UE performs BWP switch to the selected BWP, the UE may perform the random access procedure to the cell/gNB on the target selected BWP (e.g., if the UE is configured with PRACH occasions/configuration/resources on the selected configured BWP, via system information or via dedicated signaling). If the random access procedure is successful, the UE may further receive the detailed configuration to configure and/or apply for such target selected BWP from the cell/gNB. Upon BWP switch to the selected BWP, the UE may transmit the assistance information to the cell/gNB (e.g., on the target selected BWP, via a UL grant). The assistance information may relate to the BWP congestion situation. In some implementations, if a default DL/UL BWP (e.g., BWP ID) is configured, the UE may perform BWP switch to a BWP indicated by the default DL/UL BWP ID. If the default DL/UL BWP is not configured, the UE may perform BWP switch to the initial (DL/UL) BWP. The default DL/UL BWP and the initial (DL/UL) BWP may be one variant of the target selected BWP.

In some implementations, the UE may switch to a BWP based on BWP priority criteria. The BWP priority criteria may be preconfigured to the UE. Some parameters in the BWP priority criteria may be preconfigured, while some parameters in the BWP priority criteria may be configured by the cell/gNB via system information (e.g., SIB1, other SI) or dedicated signaling (e.g., RRC Reconfiguration message, RRC Reconfiguration message with information including reconfiguration with sync configuration, RRC Reconfiguration message without the information of reconfiguration with sync configuration, in the information of reconfiguration with sync configuration included in RRC Reconfiguration message, RRC Setup message, RRC Reestablishment message, RRC Resume message). The UE may derive the BWP priority based on the BWP priority criteria. When the timer expires, the UE may switch to a BWP with the highest priority. In some implementations, the UE may receive and/or store the BWP priority from the cell/gNB upon or after receiving the BWP configuration. The UE may receive the BWP priority via system information or via dedicated signaling. For example, the BWP priority associated with a BWP is provided in the BWP configuration of the associated BWP. The BWP priority may be a positive (integer) value, but not limited thereto. Thus, when the timer expires, the UE may switch to a BWP, which is supported by the cell or configured to the UE by the cell/gNB, with the highest priority. The BWP priority may be based on a bandwidth size, traffic type, and/or associated timer value. In one implementation, the BWP with a smaller bandwidth size may be associated with a higher priority. In one implementation, the BWP with a larger bandwidth size may be associated with a higher priority. In one implementation, the BWP without (DL/UL) LBT failures may be associated with a higher priority. The BWP with (DL/UL) LBT failures may be associated with a lower priority. In one implementation, the less congested BWP may be associated with a higher priority. The more congested BWP may be associated with a lower priority. In one implementation, the UE may associate the BWP(s) with different priorities on its own (e.g., based on whether the (DL/UL) LBT failures have occurred on the corresponding BWP, based on the congestion condition of the corresponding BWP). The UE may implicitly select the (target) BWP to switch to based on the BWP priority. For example, when the timer expires, the UE may select the (target) BWP to switch to based on the BWP priority.

In some implementations, the UE may receive the BWP priority list in the BWP configuration from the cell/gNB. The UE may receive the BWP priority list via dedicated signaling or via system information. In some implementations, a BWP priority list may be configured per BWP and/or per UE. The BWP priority list may include the BWP priority of each BWP configured to the UE. The BWP priority list may include at least one BWP ID(s), indicating a BWP to which the UE may switch when the timer associated with the BWP expires. The BWP priority list may include the BWP priority of each BWP supported by the cell/gNB. When the timer expires, the UE may switch to a BWP, which is supported by the cell/gNB or configured to the UE by the cell/gNB, with the highest priority. When the timer associated with one BWP expires, the UE may switch to a BWP based on the BWP priority list associated with the BWP. When the timer associated with one or more than one BWP(s) expires, the UE may switch to at least one BWP based on the BWP priority list(s) associated with the BWP(s) associated with the expired timer.

In some implementations, the UE may implicitly acquire the priority of the BWP. For example, by the order of BWP configuration in the BWP addition list via the dedicated signaling (e.g., RRC Reconfiguration message). The UE may be configured with a list of BWP configurations. The BWP configured by the first entry of the list may be associated with the highest priority. The BWP configured by the second entry of the list may be associated with the $2^{nd}$ highest priority, and so on.

In some implementations, the UE may perform BWP switch to a BWP indicated by a default DL/UL BWP ID when at least one of the following conditions is met: the BWP priority criteria is not (pre)configured to the UE, the BWP priority is not provided by the cell/gNB, the UE cannot derive the BWP priority, and a default DL BWP (e.g., BWP ID) is configured. In one implementation, the UE may perform BWP switch to the initial (DL/UL) BWP when the default DL/UL BWP is not configured.

In some implementations, the UE may perform BWP switch to the initial (DL/UL) BWP when at least one of the following conditions is met: the BWP priority criteria is not (pre)configured to the UE, the BWP priority is not provided by the cell/gNB, and the UE cannot derive the BWP priority.

In some implementations, the UE may switch to a BWP based on the channel busy ratio or channel occupancy ratio. In some implementations, the UE may sense the BWPs supported by the cell/gNB or the BWPs configured by the cell/gNB, and/or measure the reference signal(s) (e.g., SSB, Channel State Information—Reference Signal (CSI-RS), Discovery Reference Signal (DRS)) on the BWPs supported by the cell/gNB or the BWPs configured by the cell/gNB. Afterwards, the UE may determine the channel busy ratio (or channel occupancy ratio) of the sensed and/or measured BWPs. After the UE measures and/or senses the BWPs supported/configured by the cell/gNB, the UE may store and/or update the rank of the channel busy ratio (or channel occupancy ratio) for the BWPs supported/configured by the cell/gNB. When the UE performs BWP switch, the UE may switch to a BWP with the lowest channel busy ratio (or channel occupancy ratio) (e.g., based on the rank stored in the UE). In some implementations, the UE may be configured with a threshold of channel busy ratio (or channel occupancy ratio) by the cell/gNB via (receiving) system information (e.g., SIB1, other SI) or dedicated signaling (e.g., RRC Reconfiguration message, RRC Setup message, RRC Resume message, RRC Reestablishment message). The UE may store the threshold of channel busy ratio (or channel occupancy ratio) when the UE receives the threshold. The UE may replace the stored threshold of channel busy ratio (or channel occupancy ratio) with the newly received threshold when the UE receives the threshold. The UE may switch to a BWP having the channel busy ratio (or channel occupancy ratio) less than the threshold of channel busy ratio (or channel occupancy ratio). If more than one BWPs, which may be supported by the cell or configured by the cell/gNB to the UE, have the channel busy ratio (or channel occupancy ratio) less than or equal to the threshold of channel busy ratio (or channel occupancy ratio), the UE may randomly select one of them. Alternatively, if more than one BWP have the channel busy ratio (or channel occupancy ratio) less than or equal to the threshold of channel busy ratio, the UE may select the BWP having the lowest channel busy ratio.

In some implementations, if no BWP, which may be supported by the cell/gNB or configured by the cell/gNB, has the channel busy ratio (or channel occupancy ratio) less than or equal to the threshold of channel busy ratio (or channel occupancy ratio), the UE may select the BWP with the lowest channel busy ratio (or channel occupancy ratio). Alternatively, if no BWP, which may be supported by the cell/gNB or configured by the cell/gNB, has the channel busy ratio (or channel occupancy ratio) less than or equal to the threshold of channel busy ratio (or channel occupancy ratio), the UE may not perform BWP switch, and optionally the UE may (re)start the timer.

In some implementations, the UE may perform BWP switch to the initial (DL/UL) BWP when at least one of the following conditions is met: the threshold of channel busy ratio (or channel occupancy ratio) is not (pre)configured to the UE, the UE cannot derive the channel busy ratio (or channel occupancy ratio) of each configured/activated BWP, and no BWP supported by the cell/gNB or configured by the cell/gNB has the channel busy ratio (or channel occupancy ratio) less than or equal to the threshold of channel busy ratio (or channel occupancy ratio). In some implementations, the UE may perform BWP switch to a BWP indicated by the default DL/UL BWP ID (or the initial (DL/UL) BWP if the default DL/UL BWP is not configured) if the default DL/UL BWP ID is configured when at least one of the following conditions is met: the threshold of channel busy ratio (or channel occupancy ratio) is not (pre)configured to the UE, the UE cannot derive the channel busy ratio (or channel occupancy ratio) of each configured/activated BWP, no BWP supported by the cell/gNB or configured by the cell/gNB has the channel busy ratio (or channel occupancy ratio) less than or equal to the threshold of channel busy ratio (or channel occupancy ratio).

In some implementations, if no BWP, which may be supported by the cell/gNB or configured by the cell/gNB, has the channel busy ratio (or channel occupancy ratio) less than or equal to the threshold of channel busy ratio (or channel occupancy ratio), the UE may enter a power saving mode (e.g., DRX active time or skipping PDCCH monitoring for a period of time). In some implementations, if no BWP, which may be supported by the cell/gNB or configured by the cell/gNB, has the channel busy ratio (or channel occupancy ratio) less than or equal to the threshold of channel busy ratio (or channel occupancy ratio), the UE may go to RRC_IDLE and perform cell reselection. If the channel busy ratio (or channel occupancy ratio) is high, and/or if the channel busy ratio (or channel occupancy ratio) is higher than the threshold on the BWP, (DL/UL) LBT failures may occur on the BWP. If (DL/UL) LBT failures occur on the BWP, the UE may go to RRC_IDLE and perform cell reselection. When the UE goes to RRC_IDLE, the UE may release the RRC connection to the serving cell/gNB and/or release/clear the radio resource configuration to the serving cell/gNB.

In some implementations, if no BWP on SCell(s), which may be supported by the cell/gNB or configured by the cell/gNB, has the channel busy ratio (or channel occupancy ratio) less than or equal to the threshold of channel busy ratio (or channel occupancy ratio), the UE may deactivate the SCell(s) and inform the serving cell group/gNB via PCell or via PSCell. In some implementations, if no BWP on SCell(s), which may be supported by the cell/gNB or configured by the cell/gNB, has the channel busy ratio (or channel occupancy ratio) less than or equal to the threshold of channel busy ratio (or channel occupancy ratio), the UE may inform the serving cell group/gNB via PCell or via PSCell. The UE may be instructed to deactivate the SCell(s) via PCell or via PSCell. In some implementations, if no BWP on PSCell, which may be supported by the cell/gNB or configured by the cell/gNB, has the channel busy ratio (or channel occupancy ratio) less than or equal to the threshold of channel busy ratio (or channel occupancy ratio), the UE may inform the serving cell group/gNB via PCell or via SCell(s). The UE may be instructed to perform SCG release by the serving cell(s).

In some implementations, the UE may perform the random access procedure on the BWP configured with PRACH occasions/configuration/resources and/or transmit the assistance information on the BWP configured with the UL grant to the cell/gNB when at least one of the following conditions is met: the threshold of channel busy ratio (or channel occupancy ratio) is not (pre)configured to the UE, the UE cannot derive the channel busy ratio (or channel occupancy ratio) of each configured/activated BWP, and no BWP supported by the cell/gNB or configured by the cell/gNB has the channel busy ratio (or channel occupancy ratio) less than or equal to the threshold of channel busy ratio (or channel occupancy ratio). The assistance information may indicate the BWP congestion situation. The assistance information may include (but not limited to) the source cell/gNB ID and the BWP ID of the source BWP. The UE may receive the configuration of the UL grant used for the BWP via the source BWP from the cell/gNB. The source BWP may be the same as or different from the BWP configured with the UL grant. The UE may store the configuration of the UL grant used for the BWP upon receiving the configuration of the UL grant used for the BWP. Afterwards, the UE may configure itself the UL grant used for the BWP after the UE receives and/or stores the configuration of the UL grant used for the BWP. Alternatively, the UE may configure itself the UL grant used for the BWP upon performing the BWP switch procedure.

The situation that the UE cannot derive the channel busy ratio (or channel occupancy ratio) may include the case when the measured result of the corresponding BWP is not available. For example, if the cell/gNB does not transmit the reference signal(s), the measured result of the corresponding BWP may not be available. For example, if the UE does not receive the measurement configuration from the serving cell/gNB, the UE may not perform the measurement and the measured result of the corresponding BWP may not be available. The measurement configuration may be applied for the UE in RRC_IDLE/RRC_INACTIVE/RRC_CONNECTED state.

In some implementations, the UE may switch to a BWP based on the gNB's initiated Channel Occupancy Time (COT) configuration, DRS configuration, and/or SSB Measurement Timing Configuration (SMTC). The UE may receive the gNB's initiated COT configuration (and/or DRS configuration and/or SMTC) for the (DL/UL) BWP(s) (e.g., including initial (DL/UL) BWP) via system information or dedicated signaling in the active DL BWP. The UE may receive the gNB's initiated COT configuration (and/or DRS configuration and/or SMTC) for each configured BWP via the dedicated signaling in the active DL BWP. The UE may receive the gNB's initiated COT configuration (and/or DRS configuration and/or SMTC) for each BWP supported by the cell/gNB via the system information or dedicated signaling in the active DL BWP. The UE may receive the gNB's initiated COT configuration (and/or DRS configuration and/or SMTC) for the BWPs occupied by the cell/gNB via the system information or dedicated signaling in the active DL BWP.

When the timer expires, the UE may switch to a BWP having the gNB's initiated COT configuration when the following condition is satisfied: the time instant when the timer expires falls within the duration when the BWP is occupied by the cell/gNB based on the gNB's initiated COT configuration. If more than one BWP with the gNB's initiated COT configuration satisfies the condition, the UE may randomly select one of the BWPs satisfying the condition and switch to the selected BWP. If more than one BWP with the gNB's initiated COT configuration satisfy the condition, the UE may switch to the BWP with the most remaining gNB's initiated COT. If more than one BWP with the gNB's initiated COT configuration satisfies the condition and/or the initial (DL/UL) BWP is one of them, the UE may switch to the initial (DL/UL) BWP.

If no BWP with gNB's initiated COT configuration satisfies the condition, the UE may not perform BWP switch, and the UE may optionally (re)start the timer. In some implementations, if the gNB's initiated COT configuration is not (pre)configured to the UE and if a default DL/UL BWP (e.g., BWP ID) is configured, the UE may perform BWP switch to a BWP indicated by the default DL/UL BWP ID. If the default DL/UL BWP is not configured, the UE may perform BWP switch to the initial (DL/UL) BWP. In some implementations, if no BWP with gNB's initiated COT configuration satisfies the condition, the UE may perform BWP switch to the initial (DL/UL) BWP. In some implementations, if no BWP with gNB's initiated COT configuration satisfies the condition, the UE may enter RRC_IDLE, perform the random access procedure on a target switched BWP with PRACH occasions/configuration/resources, perform cell (re)selection, and/or transmit the assistance information on a target switched BWP with the UL grant. The assistance information may indicate the BWP congestion situation. The target switched BWP may be (but not limited to) the initial (DL/UL) BWP or the default DL/UL BWP.

In some implementations, when the timer expires, the UE may perform BWP switch to a BWP configured with DRS configuration and/or SMTC configuration. In some implementations, when the timer expires, the UE may perform BWP switch to an initial (DL/UL) BWP if there is no BWP configured with DRS configuration and/or SMTC configuration. In some implementations, when the timer expires, if there is no BWP configured with DRS configuration and/or SMTC configuration and a default DL/UL BWP (e.g., BWP ID) is configured, the UE may perform BWP switch to a BWP indicated by the default DL/UL BWP ID. If the default DL BWP is not configured, the UE may perform BWP switch to the initial (DL/UL) BWP. In some implementations, when the timer expires, if there is no BWP configured with DRS configuration and/or SMTC configuration, the UE may enter RRC_IDLE, perform the random access procedure on a target switched BWP with PRACH configuration, perform cell (re)selection, and/or transmit the assistance information on a target switched BWP with the UL grant. The assistance information may indicate the BWP congestion situation. The target switched BWP may be (but not limited to) the initial (DL/UL) BWP or the default DL/UL BWP.

In some implementations, when the timer expires, the UE may perform BWP switch to a BWP on which the UE may receive the DRS or SSB based on the associated DRS configurations and/or SMTC configuration. In some implementation, when the timer expires, the UE may perform BWP switch to a BWP on which the UE may receive a reference signal (RS) based on the associated RS configuration.

Implementations of the BWP switch procedure may be applied to not only the DL BWP switch but also UL BWP switch. In some implementations, the UE may perform the BWP switch procedure not only when the timer expires. For example, when the PRACH occasions/resources are not configured for the active UL BWP, the UE may perform the BWP switch procedure to switch to a UL BWP with PRACH occasions/configuration/resources. The UE may receive the PRACH configuration for the configured (or other activated) BWP(s) or for the BWPs supported by the cell/gNB, from the cell/gNB. In one implementation, the UE may perform the BWP switch procedure when LBT fails on the active UL BWP. For example, when the (UL) LBT fails on the initial UL BWP (or activated UL BWP), the UE may perform the BWP switch procedure to switch to another (UL) BWP.

gNB, ng-eNB, BS, cell/gNB, and eNB may be used interchangeably in the present disclosure.

Paging, paging channel, and PO may be used interchangeably in the present disclosure.

In one implementation, paging DCI(s) may be carried by PDCCH in a Control Resource Set (CORESET). The UE may receive the paging DCI(s) on PDCCH transmitted by the cell/gNB.

In one implementation, paging PDCCH(s) may include the DCI format 1_0 with Cyclic Redundancy Check (CRC) scrambled by P-RNTI, which may schedule the paging message. The UE may receive the paging PDCCH transmitted by the cell/gNB.

In one implementation, PDSCH may carry the paging message. The UE may receive the paging message on PDSCH transmitted by the cell/gNB.

The RRC_CONNECTED UE, RRC_INACTIVE UE, and RRC_IDLE UE may apply the implementations in the present disclosure.

In one implementation, if the UE monitors the paging channel(s), the UE may further receive the paging (e.g., paging DCI(s), paging message(s)) in the paging occasion(s).

In one implementation, other identifiers (e.g., not limited to P-RNTI, C-RNTI) may be used in the implementations in the present disclosure.

In one implementation, the system information may include MIB, SIB1 and other SI.

In one implementation, the dedicated signaling may include (but not limited to) the RRC Reconfiguration message, RRC Reconfiguration message with information including reconfiguration with sync configuration, RRC Reconfiguration message without the information of reconfiguration with sync configuration, the information of reconfiguration with sync configuration included in RRC Reconfiguration message, RRC Setup message, RRC Reestablishment message, and RRC Resume message.

In one implementation, if the UE monitors the paging channel(s), the UE may further decode the paging (e.g., paging DCI(s), paging message(s)) in the PO (s).

In one implementation, paging DCI may be a DCI with CRC scrambled by P-RNTI or by a common RNTI (e.g., C-RNTI), which indicates information related to paging. The information related to paging may include the time/frequency resource for the UE to receive paging message(s). The information related to paging may include the ETWS/CMAS notification, system information change, and RACH enhancement indicator.

In one implementation, the network may provide system information through dedicated signaling to an RRC_CONNECTED UE using the RRC Reconfiguration message. For example, an RRC_CONNECTED UE may be configured with one or more active BWP(s) with common search space configured to monitor system information or paging.

In one implementation, the PDCCH for paging that the UE successfully decodes may indicate the paging information including the UE ID or without the UE ID.

Implementations in the present disclosure may be applied on a per-Public Land Mobile Network (PLMN) or per-non-Public Network (NPN) or per-Closed Access Group (CAG) basis. For example, the respective UE belonging to different PLMN(s)/NPN(s)/CAG(s) may be configured with different parameters for the reception of PDCCH for paging in PO(s). For example, the respective UE belonging to different PLMN(s)/NPN(s)/CAG(s) may be configured with different parameters for the reception of PDCCH for paging in PO(s) in DRX. For example, the respective UE belonging to different PLMN(s)/NPN(s)/CAG(s) may be configured with different timers or the same timer in the system information or dedicated signaling. For example, the respective UE belonging to different PLMN(s)/NPN(s)/CAG(s) may be configured with different BWP switch related configuration(s) in the system information or dedicated signaling. The respective UE belonging to different PLMN(s)/NPN(s)/CAG(s) may store the corresponding BWP switch related configuration(s), and/or apply the BWP switch procedure based on the corresponding BWP switch related configuration(s) to trigger and/or perform the BWP switch procedure.

In some implementations, the UE may receive the paging (e.g., paging DCI, paging message) in the initial (DL) BWP, default (DL) BWP and/or active (DL) BWP(s).

In some implementations, the SSB set may include some SSBs. An SSB may include Primary Synchronization Signal (PSS), Secondary Synchronization Signal (SSS), and Physical Broadcast Channel (PBCH). System information (e.g., MIB) may be transmitted via the PBCH by the cell/gNB to the UE.

In some implementations, the term "BWP" may generally include UL BWP and DL BWP. If the BWP is specifically for UL, the term "UL BWP" may be used. If the BWP is specifically for DL, the term "DL BWP" may be used. If the BWP can be applied for DL and/or UL, the term "DL/UL" may be used.

In some implementations, if a configuration or a parameter is configured per cell group, it may be included in a cell group configuration. Examples of a cell group configuration may include, but not limited to, cell group configuration (e.g., CellGroupConfig IE), master cell group configuration (e.g., masterCellGroup IE), secondary cell group configuration (e.g., secondaryCellGroup IE), secondary cell group configuration for the Multi-RAT Dual Connectivity (MR-DC) scenario (e.g., mrdc-SecondaryCellGroupConfig IE), secondary cell group configuration when the secondary cell group applies NR RAT (e.g., nr-SecondaryCellGroupConfig IE), MAC parameters applicable for the entire cell group (e.g., mac-CellGroupConfig IE), and cell-group specific parameters in the physical layer (e.g., physicalCellGroupConfig IE). A cell group may include one MAC entity, a set of logical channels with associated RLC entities and a primary cell (SpCell) and one or more secondary cells (SCells).

In some implementations, if a configuration or a parameter is configured per cell, it may be included in a cell-specific configuration. Examples of a cell-specific configuration may include, but not limited to, serving cell configuration (e.g., ServingCellConfig IE, ServingCellConfigCommonSIB1 IE, ServingCellConfigCommon IE), serving cell specific MAC and PHY parameters for an SpCell (e.g., SpCellConfig IE, SpCellConfigDedicated IE, SpCellConfigCommon IE), and SCell configuration (e.g., SCellConfigCommon IE, SCellDedicated IE).

In some implementations, if a configuration or a parameter is configured per BWP, it may be included in a BWP-specific configuration. Examples of a BWP-specific configuration may include, but not limited to, general BWP configuration (e.g., BWP IE), BWP UL configuration (e.g., BWP-UplinkDedicatedIE, BWP-UplinkCommon IE, BWP-Uplink IE), and BWP DL configuration (e.g., BWP-DownlinkDedicatedIE, BWP-DownlinkCommon IE, BWP-Downlink IE).

In some implementations, the serving cell configuration (e.g., ServingCellConfig IE) may include the initial DL BWP configuration (e.g., initialDownlinkBWP IE, BWP-DownlinkDedicated IE), first active DL BWP configuration (e.g., firstActiveDownlinkBWP-Id IE, BWP-Id IE), default DL BWP configuration (e.g., defaultDownlinkBWP-Id IE, BWP-Id IE), initial UL BWP configuration (e.g., initialUplinkBWP IE, BWP-UplinkDedicatedIE), and first active UL BWP configuration (e.g., firstActiveUplinkBWP-Id IE, BWP-Id IE). The initial UL BWP configuration and the first active UL BWP configuration may further be included in an UL configuration (e.g., UplinkConfig IE), which may be included in the serving cell configuration.

In some implementations, the channel occupancy ratio (CR) evaluated at a subframe n may be the total number of sub-channels used for its transmissions in subframes [n–a, n–1] and granted in subframes [n, n+b] divided by the total number of configured sub-channels in the transmission pool over [n–a, n+b], where a and b may be positive integers. The UE may be preconfigured or configured (e.g., via system information or via dedicated signaling) by the cell/gNB, with the parameters for channel occupancy ratio measurement.

In some implementations, the channel busy ratio may be the portion of sub-channels in the resource pool (e.g., BWP) whose Reference Signal Received Indicator (RSSI) measured by the UE exceeds a (pre-)configured threshold sensed over subframes [n–c, n–1], where c may be a positive integer. The UE may be preconfigured or configured (e.g., via system information or via dedicated signaling) by the cell/gNB, with the parameters for channel busy ratio measurement.

In some implementations, the proposed timer may be different from a BWP inactivity timer. In one implementation, if a BWP is configured with the proposed timer, the UE may ignore (and/or stop and/or discard and/or release) the BWP inactivity timer associated with the BWP for BWP switch operation. In one implementation, if a BWP is configured with the proposed timer, the UE may apply at least both the proposed timer and the BWP inactivity timer associated with the BWP for BWP switch operation. If the BWP switch operation is triggered by one of the proposed timer(s) and the BWP inactivity timer, the UE may stop (and/or discard and/or release) the other timer(s) not triggering the BWP switch operation. In one implementation, if a BWP is not configured with the proposed timer but configured with the BWP inactivity timer, the UE may apply the BWP inactivity timer associated with the BWP for BWP switch operation. In one implementation, if a BWP is not configured with the BWP inactivity timer but configured with the proposed timer, the UE may apply the proposed timer associated with the BWP for BWP switch operation.

In some implementations, if the proposed timer(s) expire, and/or if the UE cannot find available (or valid) BWPs on the cell (e.g., primary cell) to switch to, the UE may enter RRC_IDLE, release RRC connection, release RRC connection with a release cause (e.g., the release cause may be 'congested cell', 'congested BWP', 'congested channel', 'RRC connection failure', or 'BWP switch failure'), and/or perform a cell reselection procedure. The RRC layer of the UE may indicate the release of the RRC connection and/or the release cause to the upper layer (e.g., NAS layer) of the UE. In one implementation, the UE may indicate an RRC connection problem to a gNB through a UL RRC message if the MAC entity of the UE indicates an LBT failure problem of this serving cell to an upper layer (e.g., RRC layer, NAS layer). During the cell reselection procedure, the UE may measure the signal quality of neighboring cell(s) and evaluate whether the measured cell(s) satisfy the S criterion and/or R criterion described in the 3GPP TS 38.304 v15.4.0. Among the candidate cells satisfying the S criterion and/or R criterion, the UE may (re)select and camp on a suitable/acceptable cell as the outcome of the cell reselection procedure.

In some implementations, if the proposed timer(s) expire, and/or if the UE cannot find available (or valid) BWPs on the cell (e.g., primary cell) to switch to, the UE may release and/or stop the Data Inactivity timer for the corresponding cell if the UE is configured by the RRC layer with a data inactivity monitoring functionality. The upper layers (e.g., RRC layer) of the UE may inform the lower layer(s) (e.g., MAC entity) of the UE to release and/or stop the Data Inactivity timer. If the lower layer(s) of the UE release and/or stop the Data Inactivity timer, the lower layer(s) of the UE may inform the upper layers of the UE of the Data Inactivity timer release. These implementations may be applied when the UE is not configured with carrier aggregation.

In some implementations, if the proposed timer(s) expire, and/or if the UE cannot find available (or valid) BWPs on the cell group (e.g., master cell group) to switch to, the UE may release and/or stop the Data Inactivity timer for the corresponding cell group if the UE is configured by the RRC layer with a data inactivity monitoring functionality. The upper layers (e.g., RRC layer) of the UE may inform the lower layer(s) (e.g., MAC entity) of the UE to release and/or stop the Data Inactivity timer. If the lower layer(s) of the UE release and/or stop the Data Inactivity timer, the lower layer(s) of the UE may inform the upper layers of the UE of the Data Inactivity timer release. These implementations may be applied when the UE is configured with carrier aggregation.

In some implementations, if the Data Inactivity timer expires when the UE is configured by the RRC layer with a data inactivity monitoring functionality, the UE may release and/or stop the proposed timer(s) associated with the corresponding BWPs. The upper layers (e.g., RRC layer) of the UE may inform the lower layer(s) (e.g., MAC entity) of the UE to release or stop the proposed timer(s) associated with the corresponding BWPs. In some implementations, the cell (or cell group) on which the BWPs associated with the released and/or stopped proposed timer(s) fall may be the cell (or cell group) associated with the Data Inactivity timer.

In some implementations, if the proposed timer(s) expire, and/or if the UE cannot find available (or valid) BWPs on the cell (e.g., secondary cell) to switch to, the UE may release and/or stop the SCell Deactivation Timer (e.g., sCellDeactivationTimer) associated with the SCell. If the SCell Deactivation Timer is stopped and/or released, the UE may perform similar procedures on the SCell when the SCell Deactivation Timer expires. For example, the UE may further deactivate or inactivate the associated SCell. The UE may stop the BWP Inactivity Timer associated with the SCell. The UE may deactivate any active BWP associated with the SCell. The UE may clear any configured DL assignment and any configured UL grant Type 2 associated with the SCell respectively. The UE may clear any PUSCH resource for semi-persistent CSI reporting associated with the SCell. The UE may suspend any configured UL grant Type 1 associated with the SCell. The UE may flush all Hybrid Automatic Repeat reQuest (HARD) buffers associated with the SCell.

In some implementations, if the SCell Deactivation Timer (e.g., sCellDeactivationTimer) expires, the UE may release and/or stop the proposed timer(s) associated with the corresponding BWPs on the SCell associated with the SCell Deactivation Timer. The lower layers (e.g., MAC entity) of the UE may inform the upper layer(s) (e.g., RRC layer) of the UE that the proposed timer(s) associated with the corresponding BWPs on the SCell (which is associated with the SCell Deactivation Timer) is released or stopped.

In some implementations, a timer may be running once it is started, until it is stopped or until it expires; otherwise it is not running. A timer may be started if it is not running or restarted if it is running. A timer may be always started or restarted from its initial value. The duration of a timer is not updated until it is stopped or expires (e.g., due to BWP switching).

Implementations in the present disclosure may be applied to the unlicensed spectrum scenario (but not limited to).

FIG. 1 is a flowchart of a method 100 performed by a UE for handing (DL/UL) LBT failure according to an example implementation of the present disclosure. In action 102, the UE may receive, from a serving cell, a BWP configuration. In one implementation, the BWP configuration may include information of a plurality of DL BWPs and/or information of a plurality of UL BWPs. In action 104, the UE may configure a plurality of UL BWPs in the serving cell based on the BWP configuration. In one implementation, the UE may store the received BWP configuration after the UE receives the BWP configuration from the serving cell. After the UE configures a plurality of UL BWPs and/or a plurality of DL BWPs based on the BWP configuration, the UE may release and/or discard the BWP configuration. Alternatively, after the UE configures a plurality of UL BWPs and/or a plurality of DL BWPs based on the BWP configuration, the UE may keep storing the BWP configuration.

In action 106, the UE may determine that LBT fails in a first UL BWP of the plurality of UL BWPs. For example, UL LBT fails. The first UL BWP may be a current active (UL) BWP of the UE. In one implementation, the first UL BWP may be a configured initial UL BWP of the UE. In one implementation, the first UL BWP may be a configured first active UL BWP of the UE. In one implementation, a MAC entity of the UE may determine whether (UL) LBT fails in the first UL BWP. For example, the MAC entity may receive an LBT failure indication from a lower layer (e.g., PHY layer) and may count the number of received LBT failure indications in a duration. For example, if the number of received LBT failure indications exceeds a threshold, the MAC entity of the UE may determine that consistent (UL) LBT failure occurs in the first BWP. In one implementation, after determining that (UL) LBT fails (or consistent (UL) LBT failure occurs) in the first BWP, the MAC entity of the UE may determine whether to inform the upper layer (e.g., RRC layer) of the UE and/or whether to discard/clear any records of LBT failure(s) on the configured BWP(s). If the MAC entity of the UE determines to inform the upper layer, the upper layer of the UE may trigger procedures (e.g., RRC reestablishment procedure, RRC release procedure) to handle the (UL) LBT failure problem. If the MAC entity of the UE determines to inform the upper layer, the UE may discard/clear any records of LBT failure(s) on the configured BWP(s). If the MAC entity of the UE determines not to inform the upper layer, the UE may perform a BWP switch procedure to switch from a BWP with LBT failures to a target BWP without the record of LBT failure before.

In action 108, the UE may switch from the first UL BWP to a second UL BWP of the plurality of UL BWPs after determining that the second UL BWP is configured with PRACH occasions/resources and LBT has not failed in the second UL BWP. In one implementation, after determining LBT fails in the first BWP, the UE may attempt LBT in another valid BWP. In one implementation, a BWP may be a valid BWP if the BWP is configured with PRACH occasions/resources and LBT has not failed in the BWP. In one implementation, the MAC entity of the UE may determine whether to indicate an LBT failure problem of this serving cell to an upper layer or select one of configured UL BWP that is configured with PRACH occasions/resources. In one implementation, the MAC entity may determine to switch to another BWP if there is still a valid BWP. The UE may indicate to the serving cell an LBT failure problem if there is still a valid BWP. In one implementation, the MAC entity may determine to indicate the LBT failure problem to the upper layer (e.g., RRC layer) if there is no valid BWP remaining. The UE may indicate to the serving cell an RRC connection problem if there is no valid BWP remaining. The UE may discard/clear/release any records of LBT failure(s) on the configured BWPs if there is no valid BWP remaining.

In action 110, the UE may release an RRC connection and transition to an RRC_IDLE state after determining that LBT has failed in each of the plurality of UL BWPs that is configured with PRACH occasions/resources. In one implementation, the UE may transmit, to the serving cell, an RRC message that includes a release cause after determining that LBT has failed in each of the plurality of UL BWPs that is configured with PRACH occasions/resources. In one implementation, the release cause may be "RRC connection failure." In one implementation, the RRC layer of the UE may inform the upper layer of the UE of the release of the RRC connection and/or the corresponding release cause. The release cause may be "RRC connection failure." In one implementation, the UE may perform a cell reselection procedure after determining that LBT has failed in each of the plurality of UL BWPs that is configured with PRACH occasions/resources.

Figure 2:
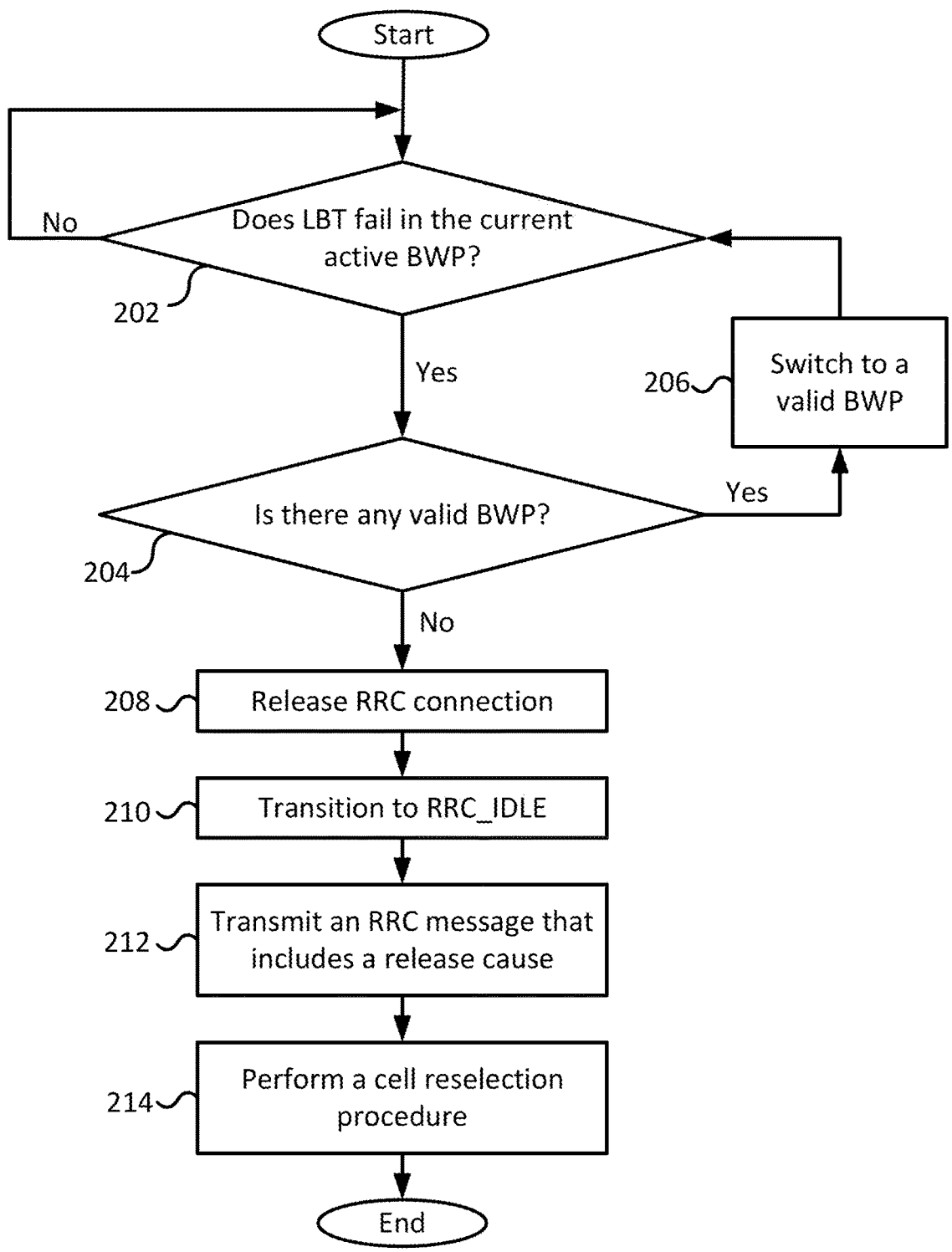
FIG. 2 is a flowchart of a method performed by a UE for BWP switch considering LBT failure according to an example implementation of the present disclosure.

FIG. 2 is a flowchart of a method 200 performed by a UE for BWP switch considering LBT failure according to an example implementation of the present disclosure. In action 202, the UE may check whether (UL) LBT fails in the current active BWP. If there is no LBT failure, the UE may perform normal UL/DL transmission/reception and the UE may perform action 202 again when needed. If (UL) LBT fails in the current active (UL) BWP, the UE may seek another (UL) BWP to attempt (UL) LBT.

In action 204, the UE may determine whether there is any valid (UL) BWP (also referred to as available (UL) BWP). If there is a valid (UL) BWP, in action 206, the UE may perform a BWP switch procedure to switch from a source (UL) BWP (e.g., the BWP in action 202) to a target (UL) BWP that is valid.

In one implementation, in action 206, the UE may initiate a random access procedure in the target (UL) BWP after switching from the source (UL) BWP to the target (UL) BWP. In one implementation, the UE may transmit assistance information to the serving cell in the target (UL) BWP. The assistance information may include BWP congestion information of the source BWP. The serving cell may identify that an LBT failure problem occurs in the source (UL) BWP and/or obtain BWP congestion information of the source (UL) BWP.

In one implementation, the UE may select the target (UL) BWP in action 206 based on a predetermined rule. In one implementation, the UE may receive a BWP priority list in a BWP configuration (e.g., the BWP configuration in action 102 illustrated in FIG. 1), and the UE may determine the target (UL) BWP based on the BWP priority list. In one implementation, the UE may determine the target (UL) BWP based on at least one of a channel busy ratio and a channel occupancy ratio. For example, the UE may choose a less congested (UL) BWP as the target (UL) BWP to enhance a probability of successful LBT in the target (UL) BWP.

If there is no valid BWP, the UE may perform various actions, including at least one of actions 208, 210, 212 and 214. The actions 208, 210, 212 and 214 illustrated in FIG. 2 should not be construed as necessarily order dependent. The order in which the process is described is not intended to be construed as a limitation. In addition, one or more of the 208, 210, 212 and 214 may be omitted in some implementations.

In action 208, the UE may release an RRC connection with the serving cell. In action 210, the UE may transition to an RRC_IDLE state. In one implementation, when the UE transitions to the RRC_IDLE state, the RRC layer of the UE may inform the upper layer (e.g., NAS layer) of the UE of the release of the RRC connection and/or the corresponding release cause, e.g., "RRC connection failure." In action 212, the UE may transmit, to the serving cell, an RRC message that includes a release cause. The release cause may be "RRC connection failure" in one implementation. In action 214, the UE may perform a cell reselection procedure.

Figure 3:
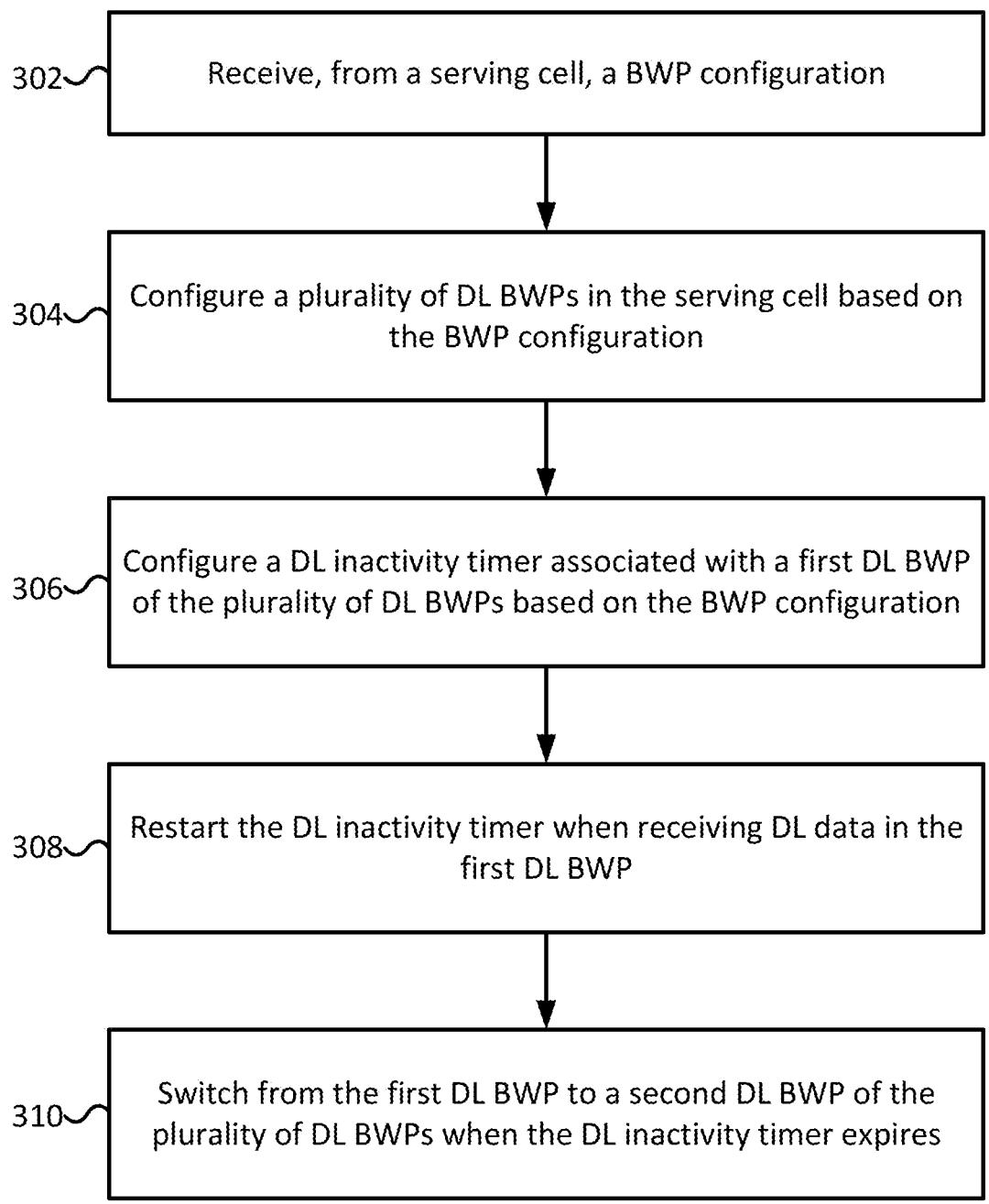
FIG. 3 is a flowchart of a method performed by a UE for DL BWP switch according to an example implementation of the present disclosure.

FIG. 3 is a flowchart of a method 300 performed by a UE for DL BWP switch according to an example implementation of the present disclosure. In action 302, the UE may receive, from a serving cell, a BWP configuration. In action 304, the UE may configure a plurality of DL BWPs in the serving cell based on the BWP configuration. In action 306, the UE may configure a DL inactivity timer associated with a first DL BWP of the plurality of DL BWPs based on the BWP configuration. In action 308, the UE may restart the DL inactivity timer when receiving DL data in the first DL BWP. In one implementation, the UE may also restart the DL inactivity timer when receiving a PDCCH addressed to a P-RNTI in the first DL BWP. In one implementation, the UE may restart the DL inactivity timer when receiving DCI and/or a MAC CE in the first DL BWP. In action 310, the UE may switch from the first DL BWP to a second DL BWP of the plurality of DL BWPs when the DL inactivity timer expires. In one implementation, there may be a second DL inactivity timer associated with the second DL BWP after the BWP switch procedure in action 310. The UE may determine when to switch from the second DL BWP to another DL BWP based on the second DL inactivity time in a similar way as previously described.

Figure 4:
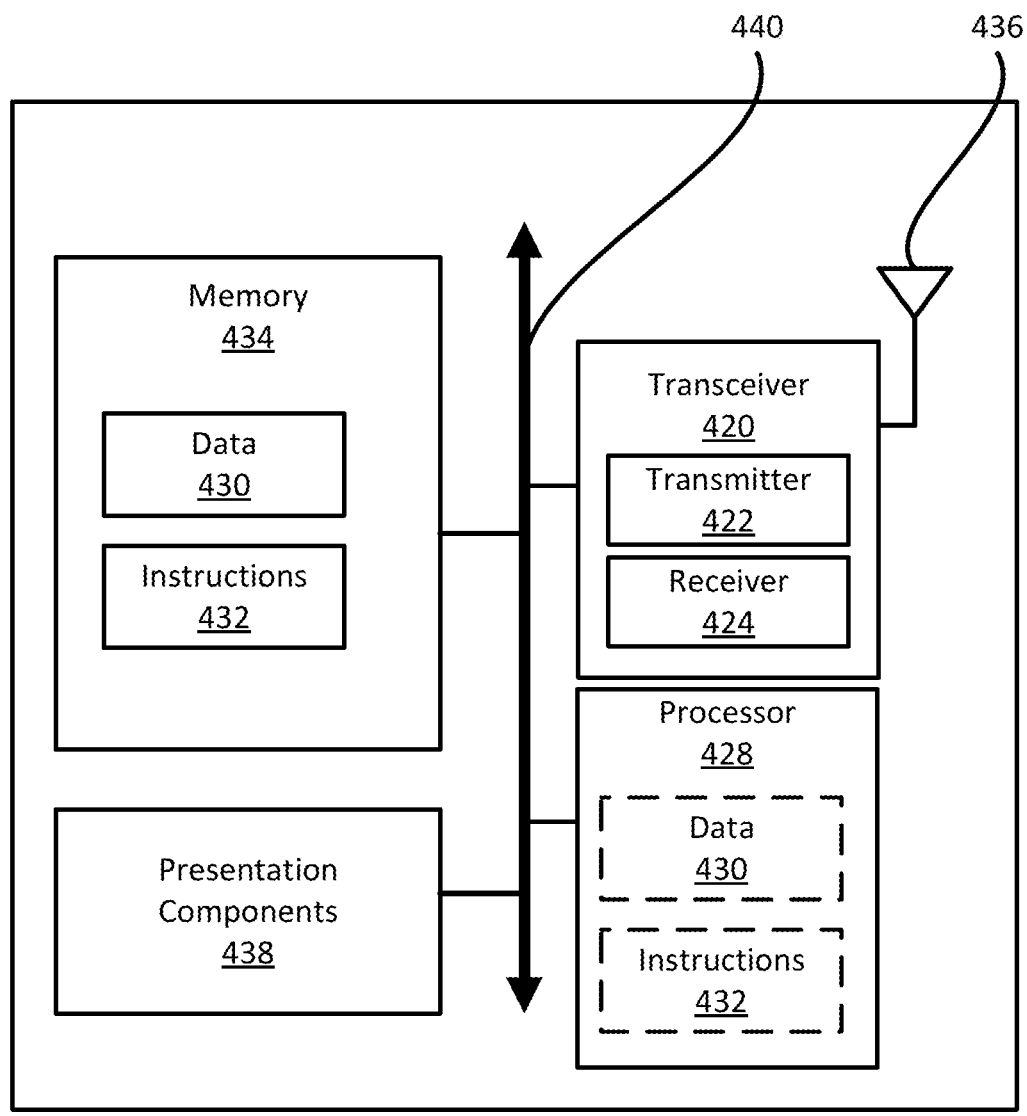
FIG. 4 is a block diagram illustrating a node for wireless communication in accordance with various aspects of the present disclosure.

FIG. 4 is a block diagram illustrating a node 400 for wireless communication according to the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable and flexibly usable subframes and slot formats. The transceiver 420 may be configured to receive data and control channels.

The node 400 may include a variety of computer-readable media. Computer-readable media may be any available media that may be accessed by the node 400 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store computer-readable, computer-executable instructions 432 (e.g., software codes) that are configured to cause the processor 428 to perform various functions disclosed herein, for example, with reference to FIGS. 1 through 3. Alternatively, the instructions 432 may not be directly executable by the processor 428 but be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the instructions 432 received from the memory 434, and information transmitted and received via the transceiver 420, the base band communications module, and/or the network communications module. The processor 428 may also process information to be sent to the transceiver 420 for transmission via the antenna 436 to the network communications module for transmission to a core network.

One or more presentation components 438 may present data indications to a person or another device. Examples of presentation components 438 may include a display device, a speaker, a printing component, and a vibrating component, etc.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE) comprising:
   one or more non-transitory computer-readable media storing a set of computer-executable instructions; and
   at least one processor coupled to the one or more non-transitory computer-readable media, the at least one processor configured to execute the set of computer-executable instructions to cause the UE to:
   receive, from a serving cell that is a special cell, a bandwidth part (BWP) configuration;
   configure a plurality of uplink (UL) BWPs in the serving cell based on the BWP configuration;
   determine that a listen-before-talk (LBT) procedure has failed in a first UL BWP of the plurality of UL BWPs;
   switch from the first UL BWP to a second UL BWP of the plurality of UL BWPs after determining that the second UL BWP is configured with physical random access channel (PRACH) occasions and an LBT procedure has not failed in the second UL BWP;
   release a radio resource control (RRC) connection with the serving cell and transition to an RRC_IDLE state after determining that an LBT procedure has failed in each of the plurality of UL BWPs that is configured with the PRACH occasions and that a timer is not running; and
   indicate, by an RRC layer of the UE to an upper layer of the UE, the release of the RRC connection with a release cause 'RRC connection failure' after determining that the LBT procedure has failed in each of the plurality of UL BWPs that is configured with the PRACH occasions.

2. The UE of claim 1, wherein the at least one processor is further configured to execute the computer-executable instructions to cause the UE to:
   perform a cell reselection procedure after determining that the LBT procedure has failed in each of the plurality of UL BWPs that is configured with the PRACH occasions.

3. The UE of claim 1, wherein the at least one processor is further configured to execute the computer-executable instructions to cause the UE to:
   initiate a random access procedure in the second UL BWP after switching from the first UL BWP to the second UL BWP.

4. The UE of claim 1, wherein the at least one processor is further configured to execute the computer-executable instructions to cause the UE to:
   configure a plurality of downlink (DL) BWPs in the serving cell based on the BWP configuration;
   configure a DL inactivity timer associated with a first DL BWP of the plurality of DL BWPs based on the BWP configuration;
   restart the DL inactivity timer when receiving DL data in the first DL BWP; and
   switch from the first DL BWP to a second DL BWP of the plurality of DL BWPs when the DL inactivity timer expires.

5. The UE of claim 4, wherein the at least one processor is further configured to execute the computer-executable instructions to cause the UE to:
   restart the DL inactivity timer when receiving a physical downlink control channel (PDCCH) addressed to a paging radio network temporary identifier (P-RNTI) in the first DL BWP.

6. The UE of claim 1, wherein the at least one processor is further configured to execute the computer-executable instructions to cause the UE to:
   receive a BWP priority list in the BWP configuration; and
   determine the second UL BWP based on the BWP priority list.

7. The UE of claim 1, wherein
   the second UL BWP is selected from the plurality of UL BWPs based on at least one of a channel busy ratio or a channel occupancy ratio.

8. The UE of claim 1, wherein the at least one processor is further configured to execute the computer-executable instructions to cause the UE to:
   transmit assistance information to the serving cell in the second UL BWP, the assistance information including BWP congestion information associated with the first UL BWP.

9. A method for wireless communication performed by a user equipment (UE), the method comprising:
   receiving, from a serving cell that is a special cell, a bandwidth part (BWP) configuration;
   configuring a plurality of uplink (UL) BWPs in the serving cell based on the BWP configuration;
   determining that a listen-before-talk (LBT) procedure has failed in a first UL BWP of the plurality of UL BWPs;
   switching from the first UL BWP to a second UL BWP of the plurality of UL BWPs after determining that the second UL BWP is configured with physical random access channel (PRACH) occasions and an LBT procedure has not failed in the second UL BWP;
   releasing a radio resource control (RRC) connection with the serving cell and transitioning to an RRC IDLE state after determining that an LBT procedure has failed in each of the plurality of UL BWPs that is configured with the PRACH occasions and that a timer is not running; and
   indicating, by an RRC layer of the UE to an upper layer of the UE, the release of the RRC connection with a release cause 'RRC connection failure' after determining that the LBT procedure has failed in each of the plurality of UL BWPs that is configured with the PRACH occasions.

10. The method of claim 9, further comprising:
performing a cell reselection procedure after determining that the LBT procedure has failed in each of the plurality of UL BWPs that is configured with the PRACH occasions.

11. The method of claim 9, further comprising:
initiating a random access procedure in the second UL BWP after switching from the first UL BWP to the second UL BWP.

12. The method of claim 9, further comprising:
configuring a plurality of downlink (DL) BWPs in the serving cell based on the BWP configuration;
configuring a DL inactivity timer associated with a first DL BWP of the plurality of DL BWPs based on the BWP configuration;
restarting the DL inactivity timer when receiving DL data in the first DL BWP; and
switching from the first DL BWP to a second DL BWP of the plurality of DL BWPs when the DL inactivity timer expires.

13. The method of claim 12, further comprising:
restarting the DL inactivity timer when receiving a physical downlink control channel (PDCCH) addressed to a paging radio network temporary identifier (P-RNTI) in the first DL BWP.

14. The method of claim 9, further comprising:
receiving a BWP priority list in the BWP configuration; and
determining the second UL BWP based on the BWP priority list.

15. The method of claim 9,
wherein the second UL BWP is selected from the plurality of UL BWPs based on at least one of a channel busy and or a channel occupancy ratio.

16. The method of claim 9, further comprising:
transmitting assistance information to the serving cell in the second UL BWP, the assistance information including BWP congestion information associated with the first UL BWP.

\* \* \* \* \*